United States Patent Office 3,391,983
Patented July 9, 1968

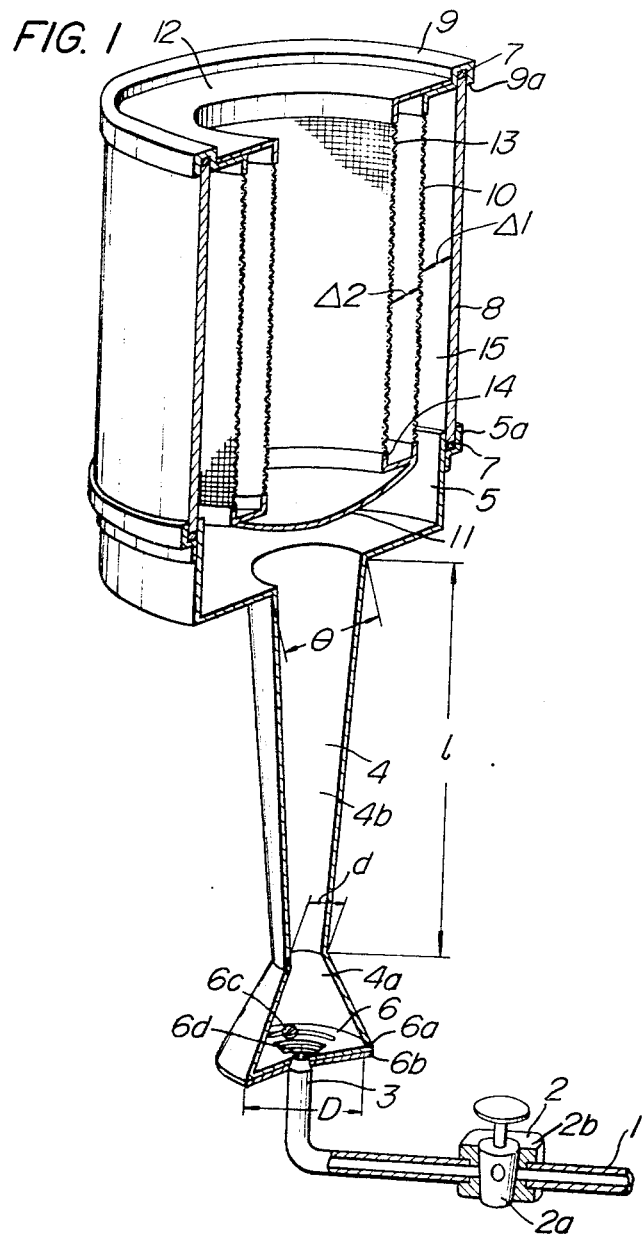

3,391,983
RADIATING GAS BURNER APPARATUS
Shinichi Harazono, Moriguchi-shi, Masahisa Tajima, Osaka, Shigeru Tanimoto, Kawachi-shi, and Tsuneo Kobayashi, Hirakata-shi, Japan, assignors to Matsushita Electric Industrial Co., Ltd., Osaka, Japan, a corporation of Japan
Filed Aug. 9, 1966, Ser. No. 571,217
Claims priority, application Japan, Aug. 12, 1965, 40/49,829
11 Claims. (Cl. 431—329)

ABSTRACT OF THE DISCLOSURE

An infra-red radiating burner apparatus using gaseous fuels comprising an outer, plain weave, heat-resistant metal net cylinder which is red-heated by the combustion heat of a gas burned on the meshes thereof so as to radiate infra-red rays, and an inner, plain weave, heat-resistant metal net cylinder disposed interior of said outer metal net in spaced relation thereto for promoting red heat of said outer metal net and combustion of fuel gas. A crystallized glass cylinder is also provided which surrounds the metal nets and is spaced therefrom so that a fuel led into the gap defined by said outer metal net cylinder and said crystallized glass cylinder is ejected towards the inner side of said outer metal net cylinder to achieve a complete combustion of the fuel without generating toxic gases or noises, said combustion being uninfluenced by an external air flow or extraneous substance.

---

The present invention relates to radiating burner apparatus of the type in which gaseous fuels, such as city gas and propane gas, are used as fuel.

Conventional radiating burner apparatus include: a type in which an unglazed pottery refractory material is used as a radiating element, said refractory material being heated to high temperatures by a high temperature combustion gas produced by the combustion of a fuel by the use of ordinary Bunsen burner; a type in which a ceramic plate having a number of fine holes bored therein is used as a radiating element, the surface of said ceramic plate being red-heated by a gas burnt thereon; and, a type in which a heat-resistant metal net is used as a radiating element which is red-heated by a gas burnt thereon.

The conventional radiating burner apparatus of the types described above will be explained hereinafter individually in further detail.

(1) Radiating burner apparatus using a refractory material as radiating element:

In this type, a radiating element, which is produced by the calcination of a blend in a suitable proportion of a Chamotte and agalmatolite and is formed with a number of flame holes in the shape of circular apertures, Meker, slit or ribbon, is red-heated to produce a radiation heat and convection heat of the combustion gas.

Consequently, the radiating burner apparatus of this type have the following drawbacks:

(a) The quantity of radiation heat effectively utilized by the human body with respect to the total quantity of heat generated by the combustion of gas is very small, namely only 40% of the total heat is emitted as radiation heat, while 60% thereof is emitted as convection heat.

(b) The radiating element of a refractory material is provided in a rectangular or spherical shape, or in the double face type, any one of which has its bottom open and has its front wall or peripheral wall formed with holes. The interior of the back wall or a suspension provided at the center of the element is red-heated to emit a radiation heat. On the interior surface of the element is provided recesses or projections in a network-like pattern so as to ease red-heating of the element.

The formation of holes in the front wall or peripheral wall of the element, therefore, results in a reduced mechanical strength of that portion, with the consequence that the element is easily broken during the assembling work on a mass-production basis or in transportation of the products or by rough handling by the consumer.

(c) Where there is an excessive difference between the strength of the solid back wall and the strength of the front wall in which the flame holes are formed, as in the case of rectangular radiating element, the weaker portion tends to be cracked due to deformation of the stronger portion upon heating.

(d) The coefficient of thermal expansion of the skeleton of the burner is so large that the skeleton is easily broken due to an internal stress even on contact with a cold substance, such as water.

In short, radiating burner apparatus of this type, i.e. the type in which radiation heat is emitted by heating a radiation element of refractory material with a Bunsen flame, are accompanied by the drawbacks that the amount of radiation heat is small and that they are susceptible to breakage.

(2) Radiating burner apparatus using ceramics as radiating element:

In this type, flame holes and radiating element are composed integrally by combining a suitable number of ceramic plates with each other with the use of a specific bonding agent. Each of the ceramic plates consists mainly of a blue whetstone and is of a size of about 67 x 46 x 11 mm. and in each ceramic plate there are formed about 950 flame holes (as intended for use with a city gas) 1 mm. in diameter. A gas jetting through a nozzle is mixed with the primary air which is sucked by the jet stream of the gas, and the mixed gas is introduced in the burner body through a Venturi-type mixing tube and released into the atmosphere through a number of small holes bored in the ceramic plate fitted in the upper face of the burner.

Radiating burner apparatus of this type, however, are not satisfactory in respect of the following:

(a) While the gas combustion takes place on the surface of the plate for a while following ignition, the flame becomes stable as the surface temperature of the ceramic plate is gradually elevated and the combustion reaction begins to take place in a layer several millimeters inside from the surface of the plate. This layer is held stationary as long as heating from the surface of the plate and cooling by the mixed gas are balanced. However, when the gas input increases resulting in an excessive elevation of the surface temperature, the gas starts to be burnt at a point deep in the flame hole, thus inducing a flash back. For this reason, the temperature of the radiating element (ceramic plate) is limited only to the range from 820° to 830° C. In addition, the radiant efficiency (ratio of radiation heat to gas input) of as low as about 50% is the maximum which can be expected to be obtained because of much heat loss caused by the absorption of heat by the mixing tube through the back wall of the ceramic plate.

(b) Since the ceramic plate is made primarily of a blue whetstone and is formed with a number of flame holes therein, as described previously, the shape of the ceramic plate is subjected to a restriction, it being impossible to provide the ceramic plate in a shape other than flat, for example, cylindrical or spherical shape.

(c) the ceramic plate is connected to the mixing tube by the use of a specific bonding agent, so that they are apt to be disconnected from each other at the joint by a mechanical or thermal shock. Disconnection of the ceramic plate from the mixing tube permits the combustion flame to be introduced into the mixing tube to cause a flash back.

(d) The mechanical strength of the ceramic plate itself is so small that excessive care is required in the handling of the burner during assembling or transportation or use by the consumer to avoid breakage of the plate. Moreover, since the ceramic plate is fixed to the mixing tube by the specific bonding agent, replacement of the plate always involves replacement of the mixing tube connected thereto, which is highly uneconomical.

(e) The ceramic plate is easily broken due to an internal stress produced on contact with water or rubber cold substances.

As described above, the radiating burner apparatus of the type in which flame holes and a radiating element are provided integrally by boring a number of circular holes in a ceramic plate, have the drawbacks of low radiant efficiency, being susceptible to breakage and being uneconomical, alike the aforementioned type of radiating burner apparatus comprising a refractory material as the radiating element.

(3) Radiating burner apparatus of the type using a heat-resistant metal net as radiating element:

In this type, a porous metal body, such as metal net of either Dutch weave or plain weave, expanded metal or punched metal, is formed into a cylindrical shape. One end of the porous metal cylinder is closed, while the other end thereof is connected to the gas discharge end of a mixing tube through which a mixture of a fuel with air is formed and delivered. A part of the air required as the primary air for fuel combustion is sucked by and mixed with the fuel which is jetting through a nozzle. The resultant mixed gas is fed from one end towards the other end of the cylindrical burner through the cylindrical porous metal body, during which period the mixed gas is burnt on the surface of said cylindrical porous metal body as it is released from the interior to the exterior thereof. The cylindrical porous metal body is heated by the heat resulting from the combustion, thus emitting infrared rays.

In the case of this type, however, since the mixed gas is fed with pressure from one end of the cylindrical burner, the gas pressure distribution at the interior of the cylindrical burner must be uniform and the flow rate of the mixed gas therein must be constant, in order to constantly maintain the temperature of the red-heated radiating element.

This is because the amount of gas led to the surface of the burner is variable depending upon the location relative to the mixing tube, namely the amount of gas is smaller at a point closer to the gas discharge opening of the mixing tube and increases progressively as the distance from the gas discharge opening becomes greater. In order to make the amount of gas uniform over the entire surface of the burner, it is necessary to reduce the total area of the pores with respect to the entire surface area of the cylinder and also to elevate the pressure at the interior of said cylinder.

Even when the temperatures at both the right and left sides of the cylindrical body are uniformalized in the manner described, however, release of the mixed gas through the pores is not effected smoothly and as a result the primary air is not supplied in an amount sufficient for satisfactory combustion. A satisfactory fuel combustion, therefore, necessitates a secondary air to be taken from the periphery of the cylindrical body, which however makes it impossible to red-heat the porous metal body effectively. For this reason, the surface temperature of the cylindrical body cannot be raised above 800° C.

In order to obtain a higher surface temperature, an attempt was made to provide the metal net in multiple layers, only with the result that the gas was cooled by the outer metal net layer and burnt incompletely with the formation of toxic gases, such as carbon monoxide.

As has been discussed hereinabove, the radiating burner apparatus of the type in which an intermediate refractory material is heated by a Bunsen-type burner and the type in which flame holes and a radiating element are provided integrally by the use of a porous body, such as of ceramics or metal net, in general, have the following drawbacks including those set out previously.

(1) The radiating element cannot be maintained at high temperatures due to insufficient air supply or possible flash back. The result is that it is impossible to generate infrared rays of a wavelength from 2 to 4µ in large amount which are suitable for heating and drying, and the amount of effective radiation is decreased.

(2) The temperature of the radiating element is inherently low and a further drastic lowering of the red-heat temperature below said temperature makes it impossible to maintain the combustion temperature, result in an incomplete combustion. Accordingly, adjustment in a wide range of the amount of heat is impossible.

(3) Even in the presence of a slight wind (at a velocity of as low as 2 m./sec.), the flame of the Bunsen burner is blown out with the consequent release of raw gases, in the case of radiating burner apparatus using a refractory material as radiating element, and, in the case of radiating burner apparatus using ceramics or metal net as radiating element, the red-hot surface of the radiating element is blackened, though not extinguished, and the combustion proceeds with an annoying sound and generation of carbon monoxide in large quantities, thus rendering the radiating burner apparatus unsuitable for practical use.

(4) In the case of a radiating element of ceramics, the element is broken or cracked due to an abrupt thermal contraction when a cold substance, such as water, is dropped thereon, while in the case of a metallic radiating element, the element is subjected to corrosion by such drop and the pores formed therein are clogged as the corrosion proceeds, preventing the ejection of gas and lowering the red-hot temperature.

The present invention has contemplated the provision of radiating burner apparatus which are free of the abovementioned drawbacks and which have many other advantages.

In more detail, an object of the present invention is to provide a radiating burner apparatus of the type which is not subjected to any influence by an external air stream.

Another object of the present invention is to provide a radiating burner apparatus of the type in which a metal net is employed as the radiating element for radiating infrared rays upon combustion of a fuel thereon and in which there is no loss of radiation heat due to absorption by the other elements.

Still another object of the present invention is to provide a radiating burner apparatus of the type in which the radiating element is made of a metal net which is capable of radiating infrared rays the majority of which wavelengths coincide with those at which infrared rays are best transmitted through glass.

Still another object of the present invention is to provide a radiating burner apparatus of the type in which a plain weave metal net is employed as the radiating element so as to reduce the resistance to the gas passing therethrough, whereby air is enabled to be sucked in an amount sufficient for a complete combustion of the gas.

Still another object of the present invention is to provide a radiating burner apparatus of the type in which air is sucked in an amount sufficient for complete combustion of any regulated amount of fuel and therefore there is no generation of toxic gases.

Still another object of the present invention is to provide a radiating burner apparatus of the type in which the combustion of a fuel proceeds with no annoying sound and the major elements participating in the combustion, including a metal net, are protected by a glass member from being directly contacted with water, oil and other substances, and the combustion is not influenced if any external substances, such as water contact with the glass member.

Still another object of the present invention is to provide a radiating burner apparatus of the type in which the direction of radiation may be easily controlled by the use of a reflection plate and which is adapted for use in a wide range of applications, including heating, drying and other common heating by means of radiation.

In order to achieve the various objects set forth above, the radiating burner apparatus of the invention comprises the following elements:

(1) A burner composed of an ordinary plain weave metal net which is woven with a heat-resistant metal wire and which is heated to high temperatures by the combuston heat of a gas burnt on the meshes thereof so as to radiate effective infrared rays.

(2) A heat-resistant, heat-transmitting element, such as crystallized glass, covering the metal net serving as infrared ray radiating element, to thereby protect said metal net against an exterior air stream, said glass being heated by the infrared rays partially absorbed therein, to ensure stable combustion of the gas on the infrared ray radiating element and to assist temperature elevation of said radiating element within the glass.

(3) Another ordinary plain weave metal net which, alike said first metal net, is woven with a heat-resistant metal wire and which is disposed interior of said first metal net in spaced relation, said metal net being red-heated by the high temperature combustion gas produced on said first metal net and maintained at high temperatures by way of heat transaction between it and said first outer metal net, to serve as an effective radiating element.

(4) A nozzle for ejecting a fuel and a mixing tube for mixing said fuel with air in an amount sufficient for the combustion of fuel, which is sucked by said fuel jetting through the nozzle, therein, the resultant mixed gas being introduced in a space defined by said first combustion metal net and said heat-resistant, heat-transmitting element, wherein it is distributed in such a manner as to obtain satisfactory combustion.

(5) Means to hold each of the aforementioned elements in position, said means comprising an element adapted to close the annular top opening defined by said combustion metal net and said gas while maintaining a predetermined space therebetween, said element having a gas exhaust hole formed in the center thereof, and an element adapted to close the bottom of said outer metal net, the joints of said glass with said first and second elements being sealed by means of gaskets, whereby the mixture of the fuel gas and air may be introduced to the metal net in a rational manner to ensure effective combustion.

(6) Means to control the fuel combustion on said combustion metal net and the characteristics of the infrared ray radiation as required, said means comprising a nozzle for feeding the fuel therethrough, a contol valve adapted to contol and adjust the fuel supply as required, and a damper by means of which the amount of air being sucked is adjusted to be optimum for the combustion of fuel.

The features and effects of the invention are as follows:

(1) The outer circumference of the mixing tube is completely encircled by a glass tube from the inlet of air and gas to the outlet of exhaust gas, forming a kind of chimney. Accordingly, the exhaust gas heated by combustion reaction and diluted in density flows upwardly at a rapid speed and serves to suck in upwardly the mixed gas. This sucking action increases the amount of primary air sucked in, and also increases the jet speed from the mesh surface. By increasing the jet speed, the balance of primary air with combustion rate is made more stable, preventing occurrence of back flash.

(2) The combustion reaction surface is on the opposite side of the glass, and the energy take-out side is opposite to the combustion surface. Therefore, the viewers will have a view of clear red heat surface with no combustion flame present thereon.

(3) Since approximately one hundred percent of the heat generated by combustion reaction is utilized for raising the temperature of the burner, the rate of the radiant energy with respect to the conversion heat is very high. Therefore, the efficiency for converting into radiant energy is high. (The heat is apt to be closed within the glass cylinder due to the fact that the burning portion is enclosed within the glass cylinder.)

The present invention will be explained in further detail by way of an example illustrated in the accompanying drawings, in which:

FIGURE 1 is a perspective view of a radiating burner apparatus according to the present invention;

FIGURES 2a through 2c respectively are enlarged perspective views illustrating different types of joint of a metal net employed in the embodiment of the present invention;

Figure 2A:
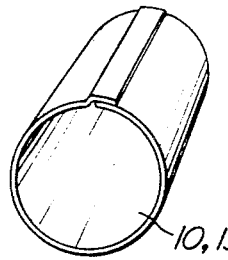
Figure 2B:
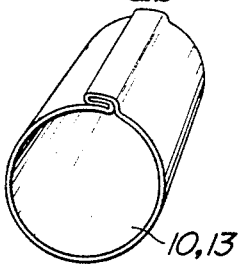
Figure 2C:
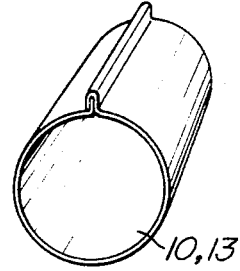
Figure 3:
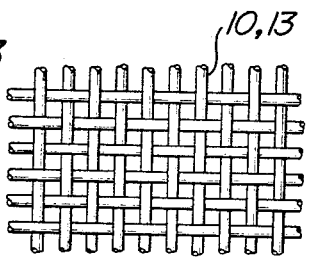
FIGURE 3 is a fragmentary plan view in enlargement illustrating the meshes of the metal net.

First of all, the construction of the radiating burner apparatus of the present invention will be described with reference to an embodiment shown in FIGS. 1, 2 and 3.

Referring specifically to FIG. 1, reference numeral 1 denotes a fuel supply tube, 2 a flow rate regulating valve provided on the fuel supply tube, 3 a fuel injection nozzle and 4 a mixing tube. The mixing tube 4 has an air suction member 4a, and an air regulating means 6 is provided at the joint of said suction member 4a with said fuel ejection nozzle 3 for the free adjustment of the primary air being introduced into the mixing tube through the air suction member 4a.

The mixing tube 4 is connected to a mixing chamber 5 and an annular groove 5a is formed around the periphery of said mixing chamber 5 for mounting a hollow cylindrical body 8 of a heat-resistant, heat transmitting material therein through the intermediary of a gasket 7. Inside of the hollow cylindrical body 8 is disposed an outer metal net cylinder 10 in a spaced relation. The bottom end of the outer metal net cylinder 10 is closed by a bottom plate 11, while an annular opening defined by the top end of the outer metal net cylinder 10 and the top end of the hollow cylindrical body 8 is closed by an annular cap 9 through the intermediary of the gasket 7. An inner metal net cylinder 13 is disposed interior of said outer metal net cylinder 10 with a predetermined space therebetween and one end of said inner metal net cylinder is supported by a flange 14, while the other end is secured to the annular cap 9.

In more detail, the fuel supply tube is connected to the body 2b of the flow rate regulating valve 2 by way of screw engagement. In the valve body 2b there is formed a frusto-conical hole in which a frusto-conically shaped stopper 2a having a gas passage therein is received.

The fuel ejection nozzle 3 is connected to the opposite end of the valve body by way of screw engagement, with the tip end directed towards the air suction member 4a of the mixing tube 4. The primary air flow rate adjusting means 6 is composed of an air damper base 6a fixed to the end surface of the primary air suction member 4a of the mixing tube 4 and an air damper rotary plate 6b which is adapted to rotate about the fuel ejection nozzle 3 in sliding contact with the air damper base 6a and is urged against the air damper base 6a by means of a bolt extending through a slit. The air damper base 6a and the air damper rotary plate 6b each are formed therein with a fan-shaped air passage hole 6d having a central angle of 90° in a symmetrical relation with respect to the axis of the nozzle. When the radiating burner apparatus is in use, the air damper rotary plate 6b is fixed at a predetermined position relative to the air damper base 6a in accordance with the quantity of heat generated by the fuel, so that the primary air is supplied in an amount just sufficient to maintain the best combustion condition.

The mixing tube 4 consists of the primary air suction member 4a and a mixing tube member 4b wherein the fuel is mixed with the primary air. The primary air suction member 4a has the diameter reduced progressively from one end to the other end to form a neck at the joint with the mixing tube member 4b, which has the diameter progressively increasing from the joint at a small rate.

The dimensions of the mixing tube are suitably determined according to the configuration and capacity, etc. of the burner. In the embodiment illustrated herein, the diameter D of the primary air suction member is preferably 60 mm.; the diameter d of the neck portion is preferably 20 mm.; the diameter $\theta$ of the expanded end of the mixing tube member is preferably 30 mm.; and the length $l$ thereof is preferably 140 mm.; providing that a city gas of a capacity of 4500 Kcal./m.$^3$ is used as a fuel gas at a pressure from 40 to 100 mm. H$_2$O and the diameter of the nozzle is 2.7 mm. (the quantity of heat generated being 3000 Kcal./h. at a gas pressure of 70 mm. H$_2$O). In this case, the area of air passage in the primary air flow rate regulating means 6 is preferably from 0.78 to 1.17 cm.$^2$.

The mixing chamber 5 is formed into a bowl shape with an opening provided in its bottom for communication with the mixing tube 4. A frame member is attached to the upper end periphery of the bowl-shaped portion to provide the annular groove 5a.

The gasket 7 disposed in the annular groove is a winding in a suitable thickness of an inorganic fibrous material composed of SiO$_2$, Al$_2$O$_3$, NaO$_3$ and CaO and has sealing, shock absorbing and heat insulating effects.

The hollow, cylindrical, heat-transmitting element 8 mounted in said annular groove is made, for example, of a crystallized glass, such as Pyrex glass, Pyroceram or Vycor glass, or quartz glass, which has a good infrared percent transmission and is resistant to abrupt cooling. The outer metal net cylinder 10 is prepared by forming a metal net sheet into a cylindrical shape which is woven with a heat-resistant wire of an iron-chromium alloy or nickel-chromium alloy in such a manner that the number of meshes along the weft is equal to the number of meshes along the warp, with its edges joined together in the manner shown, for example, in FIG. 2a, followed by spot or seam welding. The bottom end of the cylinder is closed by a suitable hemispherical bottom plate 11 welded peripherally thereto, so that the mixed gas fed from the mixing tube 4 is distributed uniformly in the annular gas passageway 15.

On the other end or the upper end of the cylinder 8 is mounted the annular cap 9, the outer peripheral portion of which is flexed to form an inverted U-shaped frame 9a for receiving a gasket 7 therein and the inner peripheral portion of which is flexed downwardly, to thereby close the annular opening between the cylinder 10 and the heat-transmitting element 8.

The inner metal net cylinder 13 is prepared by forming a metal net sheet, similar to the outer metal cylinder 10, into a cylindrical shape, with the edges joined together. The bottom end of the inner metal net cylinder is held by a fixed cap 14 which is provided to hold said inner metal net cylinder in a predetermined spaced relation to the outer metal net cylinder, while the upper end is secured to the downwardly flexed inner peripheral portion 12 of the annular cap 9.

In the radiating burner apparatus of the present invention, the dimensions of the outer and inner metal net cylinders relative to the dimensions of the heat-transmitting element are of particular importance.

Namely, the outer metal net cylinder 10 used in the radiating burner apparatus of the invention, as adapted for use with a common city gas (primarily composed of coal gas) and a liquid petroleum gas, such as propane or butene, is prepared by forming a metal net into a cylindrical shape in which heat-resistant wires of from 0.15 to 0.55 mm. in diameter are interlaced perpendicularly with each other such that the number of meshes formed by the warp wires along the weft wire is the same as the number of meshes formed by the weft wires along the warp wire (i.e. plain weave) and the number of meshes is from 20 to 50 per 25.4 mm. of the weft wire or the warp wire.

Similarly, the inner metal net cylinder is prepared by forming a metal net sheet into a cylindrical shape which is woven in the same manner as that for the outer metal net cylinder, except that the diameter of the wire used is from 0.15 to 0.7 mm. and the number of meshes on the same basis is from 10 to 50.

The space interval $\Delta 1$ between the heat-transmitting element 8 and the outer metal net cylinder 10, and the space interval $\Delta 2$ between said outer metal net cylinder 10 and the inner metal net cylinder 13, are substantially constant peripherally as well as vertically, the values of both the $\Delta 1$ and $\Delta 2$ being in the range from 6 to 15 mm.

These values are determined by the combustion capacity of the radiating burner apparatus with the use of aforementioned fuels and the temperature of the radiating burner apparatus required by the conditions in which it is used, but any value in the range specified will enable an essentially satisfactory combustion to be obtained.

As an example, the specification of a radiating burner apparatus which is capable of generating a heat of 3000 Kcal. per hour using a city gas (coal gas) of 4500 Kcal./m.$^3$ is shown below:

With this radiating burner apparatus, the best combustion can be obtained when the diameter of the wire used for weaving the outer metal net cylinder 10 and the inner metal net cylinder 13 is 0.25 mm.; the numbers of meshes for each 25.4 mm. of the weft and warp wire are both 40; the diameter of the outer metal net cylinder is 72 mm. and the height thereof is 125 mm. (which is the actual length of combustion); the distance between the outer and inner metal net cylinders is 10 mm.; and the distance between the outer metal net cylinder and the heat transmitting element is also 10 mm.

Now, the specification of a radiating burner apparatus capable of generating a heat of 3000 Kcal. per hour using a liquid petroleum gas of a capacity of 12,000 Kcal./kg. is as follow:

Namely, with this radiating burner apparatus, the best combustion can be obtained when the diameter of the wires, with which the outer and inner metal net cylinders are woven, is 0.32 mm.; the numbers of meshes for each 25.4 mm. of the weft and warp are both 30; and other specifications are the same as those for the previous example using a city gas.

The operation of the radiating burner apparatus of the invention will now be explained hereinafter. When the flow rate adjusting valve 2 is opened, a fuel gas supplied through the fuel supply tube 1 is ejected into the mixing tube 4 through the nozzle 3. In this case, the jetting gas sucks air through the air passage hole 6d defined by the air damper base 6a and the air damper rotary plate 6b by the sucking action, which are previously set by the primary air flow rate adjusting means 6. The primary air thus sucked is thoroughly mixed with the fuel gas in the mixing tube 4 and the mixed gas is ejected into the mixing chamber 5 through the extreme end of the mixing tube. In the mixing chamber 5, the mixed gas is uniformly distributed by the closing cap 11 and introduced in the annular space defined by the outer metal net cylinder 10 and the heat-transmitting element 8.

In this case, it should be noted that an excessively small diameter D of the primary air sucking opening will result in an insufficient amount of air to be sucked, causing incomplete combustion, while an excessively large diameter will only increase the size of the pertinent area with no advantage in air sucking effect. On the other hand, a smaller diameter $d$ of the neck portion formed at the top end of the air sucking member will result in an insufficient amount of air to be fed in the mixing tube, thus causing incomplete combustion, while, when the diameter is too large, the result will be a reduced air sucking effect inviting an air shortage.

The length $l$ of the increasing diameter portion is determined in relation with the diameter $d$ of the neck portion. In order to obtain a satisfactory mixture of the sucked air and the fuel gas, the length $l$ should be of the order of 6 to 8 times the diameter $d$ of the neck portion.

The maximum diameter $\theta$ of the increasing diameter portion should be determined so as to be optimum for the specification of the burner, and a larger diameter will result in a smaller flow rate of the gas being ejected, while a smaller diameter will interfere with the gas flow resulting in an insufficient amount of air to be sucked.

The mixed gas fed to the outer metal net cylinder 10 is subjected to a suitable resistance by the elementary wires and ejected uniformly to the interior surface of the cylinder through the meshes, and burnt on the interior surface thereof upon ignition. The flame resulting from the combustion of the mixed gas froms a very thin flame layer on the surface and the elementary wires of the outer metal net cylinder are heated red-hot by the combustion heat, emitting a heat radiation. The heat of the gas burnt on the interior surface of the outer metal net cylinder 10 also heats the inner metal net cylinder 13 red-hot and the combustion gas is discharged through the gas exhaust opening at the top of the burner.

The outer metal net cylinder is heated to a high temperature by the heat radiation from the red-hot, high-temperature inner metal net cylinder as well as the heat shielding action of the heat-transmitting element 8. Thus, the radiation heat emitted by the outer metal net cylinder 10 transmits through the heat-transmitting element 8 to reach the object to be heated.

The present inventors have conducted various experiments with a view to determining the best specification for the radiating burner apparatus of the invention, the results of which will be described hereinafter in detail.

*Wavelength of radiation and temperature of radiating element*

Figure 5:
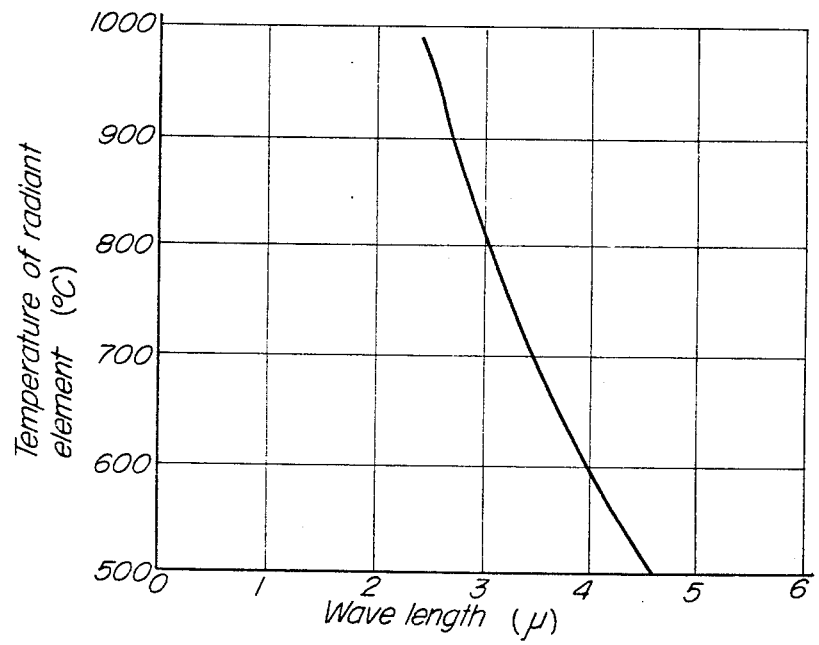
FIGURE 5 is a chart illustrating the relationship between the wavelength of the infrared rays emitted by the radiating element used in the burner apparatus of the invention and temperature.
Figure 4:
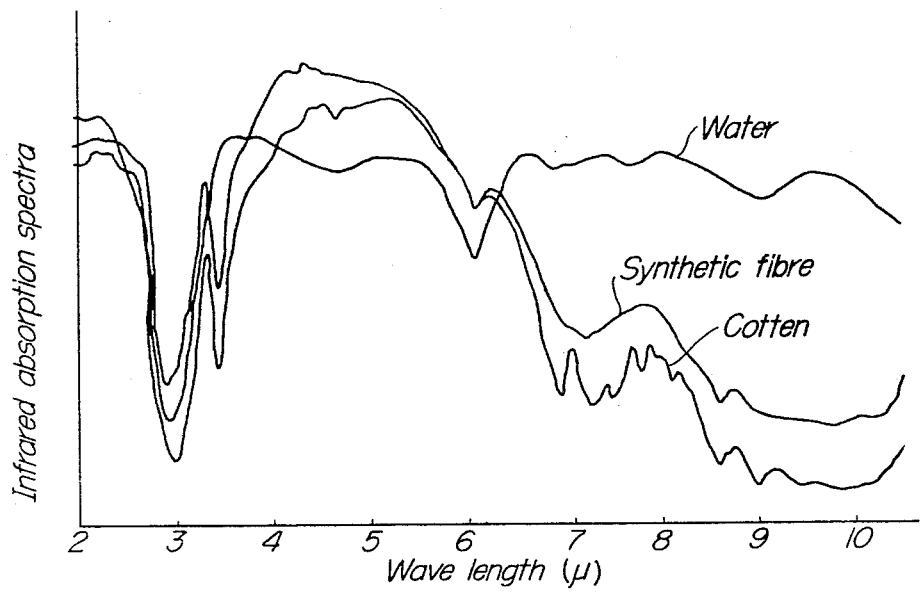
FIGURE 4 is a chart illustrating the infrared absorption spectra of water, cotton and a synthetic fiber.

In order for a hot-red radiating element to radiate infrared rays of effective wavelengths, the temperature of the radiating element is of importance. In the use of radiating burner apparatus for heating the human body or drying, water, cotton and synthetic fibers best absorb infrared rays having a wavelength of the order of $3\mu$ and higher than $7\mu$ as can be seen from FIG. 4 showing the infrared ray absorption spectra of said substances. For the efficient use of radiating burner apparatus, therefore, the infrared rays to be emitted by the radiating element should predominantly consist of those whose wavelengths are in the vicinity of $3\mu$. Now, the present inventors have conducted a research to establish the relationship between the temperature of the metal net woven with a heat-resistant wire, which is used in the radiating burner apparatus of the invention, and wavelength of the infrared ray emitted by said metal net as it is heated red-hot by gas combustion, the result of which is shown in FIG. 5. From this figure, it has been discovered that, in order to obtain infrared rays having wavelengths in the vicinity of $3\mu$, the metal net should be heated to a temperature from 800° to 850° C.

*Relationship between temperature and structure of radiating element*

With conventional radiating burner apparatus, the highest temperature which could be obtained from the radiating element was approximately 800° C. even with the use of a metal net as the radiating element, and at a temperature higher than approximately 800° C., the combustion could not be uniform and caused a back flash. There have been proposed other types of radiating burner apparatus but none of them were of the type in which the temperature of the radiating element could be elevated to 850° C. without causing flash back or generation of carbon monoxide, the combustion is stable without being subjected to the influence of an exterior air flow, and the temperature of the radiating element is adjustable in the range of 800° to 850° C.

This problem has been solved in the present invention in a simple manner by the use of a conventional plain weave metal net. Namely, according to the present invention, as has been described previously, a mixed gas consisting of a fuel gas and the primary air is ejected through the outer metal net cylinder inwardly and burnt on the interior surface of said metal net cylinder to heat the same, the burning gas forming an extremely short flame on every mesh of the metal net. The high temperature heat of the combustion gas is further absorbed by the inner metal net cylinder, disposed interior of said outer metal net cylinder, to red-heat the same. As such, the space between both metal net cylinders is maintained ture heat of the combustion gas is further absorbed by in a high temperature combustion gas atmosphere to promote elevation of the temperatures of both cylinders.

Figure 6:
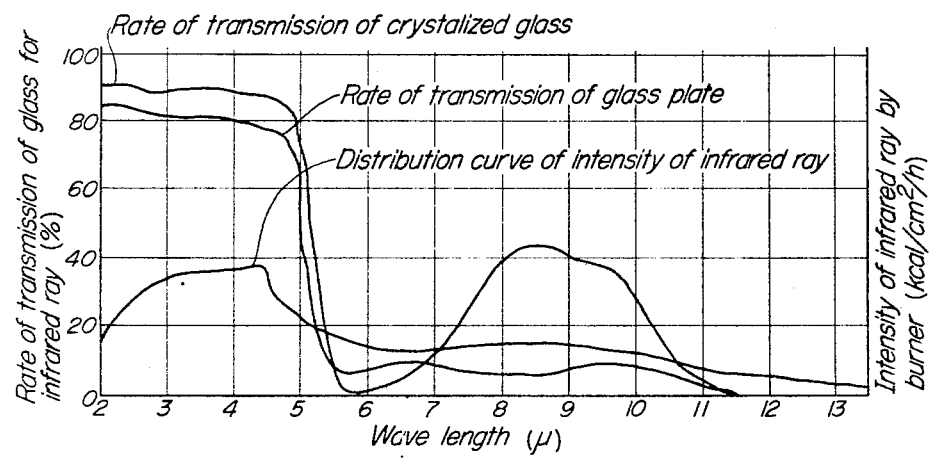
FIGURE 6 is a chart illustrating a distribution curve of intensity of the infrared rays produced by the radiating burner apparatus of the invention and transmission curves of glasses.

Furthermore, the heat-transmitting element of a heat-resistant material is disposed exterior of the outer metal net cylinder in a surrounding relation so as to permit the radiation heat to transmitted therethrough and to eliminate the influence of exterior air flow on the gas combustion, said heat-transmitting element defining a gas passage on the outside of the outer metal net cylinder. This heat-transmitting element, which serves as a protection for the high temperatures of the outer and inner metal net cylinders as well as the high temperature atmosphere between said cylinders against possible influences of exterior cold air and other cold substances, such as water, is made of a crystallized glass (ceramic glass) having an extremely small coefficient of thermal expansion, such as $6\times10^{-7}$ cm./cm.° C. Therefore, it will well withstand an abrupt cooling and shock and, in addition, while it permits the infrared rays having wavelengths effectively used for heating and drying to be transmitted therethrough satisfactorily, it absorbs a part of the infrared rays outside said range. The heat-transmitting element is, therefore, heated slightly, which not only enhances the protecting effect described above but also eases elevation and maintenance of the outer and inner metal net cylinder temperatures. The rate of infrared ray transmission of the crystallized glass is shown in FIG. 6 in comparison with that of a thick plate glass. From this figure, it will be apparent that the crystallized glass has a good rate of transmission for infrared rays having a wavelength of $3\mu$ and from 8 to $9\mu$, and a better radiation heat can be obtained with this glass than with normal glass. As such, a radiating burner apparatus free of carbon monoxide generation and flash back has been achieved according to the present invention.

*Wavelengths of infrared rays emitted by radiating element and wavelengths of infrared rays absorbed by ceramic glass, water, cotton and synthetic fibers*

The wavelength distribution of the infrared rays radiated by the radiating element is shown in FIG. 6 for the purpose of comparison with the rate of transmission of the crystallized glass. From this figure, it will be seen that the strength curve of infrared rays emitted by the radiating element has a peak at the wavelength of 3 to $4\mu$ and extends further at the wavelengths of 7 to $11\mu$ and longer wavelengths. On the other hand, the rate of infrared transmission curve of the ceramic glass is bottomed at the wavelength of $6\mu$. It will be understood from this that the ceramic glass absorbs an infrared ray of a wavelength of $6\mu$ to elevate its own temperature so as to protect the radiating element against exterior cold air and water, etc., but permits the transmission of infrared rays of wavelengths from 3 to $4\mu$ and also from 7 to $11\mu$ efficiently. Upon comparing this with the infrared rays absorption spectra of water, cotton and synthetic fibers shown in FIG. 4, it will be appreciated that the infrared rays of wavelengths which are effectively utilized for heating or drying are radiated without being absorbed by the ceramic glass, whereas those having wavelengths in the vicinity of $6\mu$, which are not needed for heating or drying, are absorbed by the ceramic glass to assist maintenance of the high temperature of the burner.

*Quantity of heat generated with respect to net area*

Figure 7:
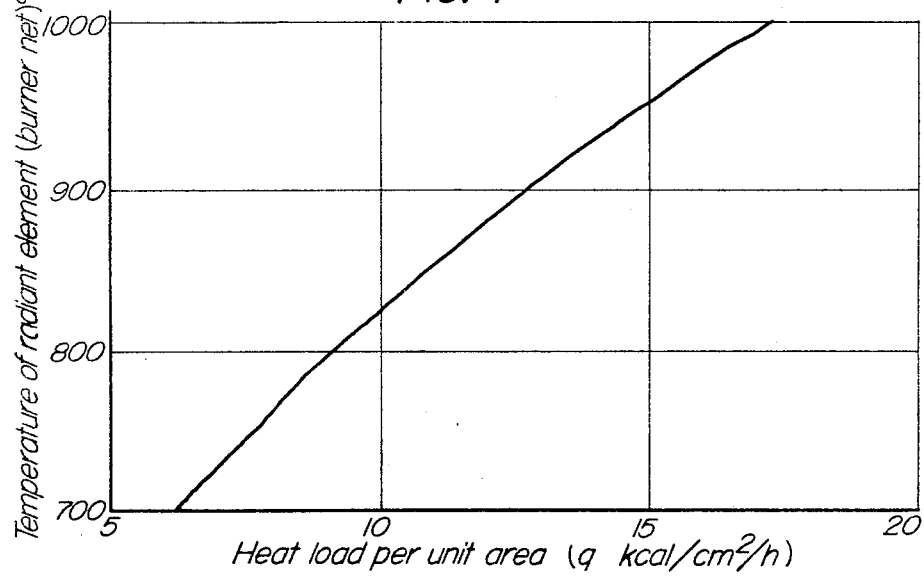
FIGURE 7 is a chart illustrating the relationship between the temperature of the radiating element and the heat load per unit area.

The infrared ray absorption spectra of water, cotton and synthetic fibers have a peak in the vicinity of the wavelength of $3\mu$ and when this is taken in conjunction with FIG. 5, it is evident that, in order to obtain a satisfactory radiation heat for heating or drying, it is only necessary to heat the radiating element (metal net) to a temperature from 800° to 850° C. The present inventors have obtained, through experiments, the relationship between the temperature of the radiating element (metal net) and the heat load per unit area (1 cm.$^2$) of the outer metal net cylinder, the result of which is shown in FIG. 7.

Referring to the chart shown in this figure, the abscissa is scaled by heat load per unit area and the ordinate by temperature of the radiating element (measured at the center of the outer metal net cylinder). As shown, the relationship is substantially proportional. It is understood from this relationship that a heat load per unit area of 9 to 11 Kcal./cm.$^2$/h. is required to obtain the radiating element temperature of 800° to 850° C., and a heat load of 10 Kcal./cm.$^2$/h. is required to obtain a temperature of 825° C. which is the middle of the 800° to 850° C. range. On this basis, it is possible, according to the present invention, to set the radiating element at a temperature suitable for heating and drying.

In the radiating burner apparatus of the present invention, it is also possible to elevate the temperature of the radiating element above 850° C. by increasing the heat load per unit area. However, higher temperatures of the radiating element result in shorter wavelengths of the radiation energy, which will in turn diminish the thermal characteristics and reduce the absorption of radiation by an article being radiated. In addition, there are the drawbacks that there is the tendency of flash back, that the radiating element emits a dazzling light and that the mechanical strengths of the radiating element are markedly reduced.

On the other hand, the heat load per unit area can be reduced to as low as 6 Kcal./cm.$^2$/h., namely the temperature of radiating element is lowered to such a level at which the radiating element is slightly red-heated, and, even with such a low heat load, perfect combustion of gas can be continued since the radiating element is covered by the heat-transmitting element against the wind or other cooling substances. The quantity of radiation emitted by the radiating element can also be adjusted easily by the operation of a cock.

*Diameter, height and number of meshes of metal net cylinder*

As stated previously, the heat load per unit area required for heating the outer metal net cylinder to a temperature of 825° C., which is the middle of the 800° to 850° C. range, is 10 Kcal./cm.$^2$/h. When a radiating burner apparatus having a combustion capacity of 3000 Kcal./h. is to be produced using a metal net having the heat load mentioned, the total area of the outer metal net cylinder is calculated as follows:

Total Surface Area =

$$\frac{\text{Combustion Capacity}}{\text{Heat Load per Unit Area}} = \frac{3000}{10} = 300 \text{ cm.}^2$$

Figure 8:
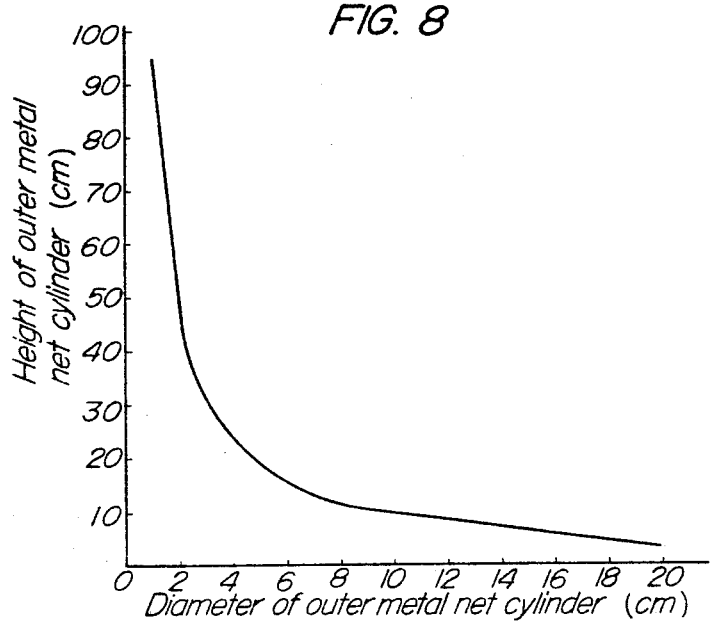
FIGURE 8 is a chart illustrating the relationship between the height and diameter of the outer metal net cylinder used in the present invention having a total surface area of 300 cm.$^2$.

The relationship between the diameter and height of an outer metal net cylinder having a total surface area of 300 cm.$^2$ is shown in FIG. 8. From the curve shown in this figure, it will be understood that where an elongated cylinder is desired, it may be 20 mm. in diameter and 475 mm. in height, while where a short, thick cylinder is desired, it may be 150 mm. in diameter and 70 mm. in height. However, when the cylinder is elongated, a temperature difference is produced between the upper and lower portions of the metal net, rendering radiation distribution of infrared rays uneven, while, when the cylinder is thick and short, the diametrical mechanical strength of the cylinder is reduced with the tendency of deformation upon heating. A metal net cylinder which ensures the temperatures at the upper and lower portions to be uniform and which has a sufficient mechanical strength to withstand deformation, preferably has a diameter ranging from 60 to 80 cm. and a height ranging from 155 to 115 mm.

The inner and outer metal net cylinders in the present invention serve on one hand as a radiating element as described hereinabove, but also serve on the other hand as a combustion element by means of which a mixed gas ejected through the meshes is burnt. Therefore, the combustion state of the burner apparatus is influenced by the number of meshes in the metal net, that is the ratio of the total area of the air spaces in the metal net to the total surface area of said metal net.

In order to obtain perfect combustion, the outer metal net cylinder is preferably woven with a wire of a diameter ranging from 0.55 to 0.15 mm. and has a number of meshes ranging from 20 to 50 per length of 25.4 mm., and the inner metal net cylinder is preferably woven with a wire of a diameter ranging from 0.7 to 0.15 mm. and has a number of meshes ranging from 10 to 50 per a length of 25.4 mm. Any combination of an outer and an inner metal net cylinder within the ranges specified will enable a perfect combustion to be obtained, although there may be combinations with which an undesirable pattern is formed on the surfaces of the cylinders due to thermal interference therebetween upon red hot, thus spoiling the appearances.

In short, when the aforementioned air space ratio is excessively small, the primary air cannot be sucked in in a sufficient amount and the resultant shortage of air will cause the formation of an outer flame and generation of carbon monoxide, while when the air space ratio is excessively great, on the contrary, there is the tendency of flash back even by a slight turbulence of air. This signifies that a stable combustion can be obtained only when the combustion rate of a fuel gas being ejected through the meshes of metal net and the rate of fuel ejection are balanced. The air space ratio of a metal net is variable depending upon the diameter of the metal wire used for weaving said metal net and the number of meshes in the metal net per length of 25.4 mm., there being the relationship that the greater the wire diameter is, the smaller the air space ratio will be and the smaller the wire diameter is, the greater the air space ratio will be. The air space ratio of the inner and outer metal net cylinders defined above is in the range from 30 to 50%.

When fuel combustion is effected with a metal net having an air space ratio of 30%, the temperature of the metal net reaches 825° C. Even when the air space ratio is below 30%, the outer and inner metal net cylinders having such air space ratio can of course be heated to temperatures in the range capable of emitting radiation energy, such metal net cylinders are not suitable for practical use because of generation of carbon monoxide. On the contrary, when the air space ratio is made greater, the temperature at the upper portion of the inner and outer metal net cylinders reaches 890° C. and thus flash back occurs at a point of air space ratio of 50%. Therefore, metal nets having an air space ratio greater than 49% are not suitable for practical use either. In consequence, a stable combustion and radiation in a sufficient amount of radiation energy of the wavelengths adapted for heating can be achieved simultaneously when the air space ratio of the inner and outer metal net cylinders is in the range from 30 to 50%.

It should be noted that, although there are a number of combinations of wire diameter and number of meshes for the air space ratio in the range from 30 to 50%, preferable wire diameter and number of meshes may be determined by taking the mechanical strengths and workability of the resultant metal net cylinder into consideration.

*Space interval between metal net cylinder and glass*

The outer metal net cylinder and the heat-transmitting element define a passage for the mixed gas therebetween. The greater the space interval is, the more the flow of the mixed gas in said passage will be eased, so that the temperature at a portion in the proximity of the annular closing cap is elevated higher than the other portions, resulting in uneven temperature distribution. On the contrary, when the space interval is too small, suction of the primary air at the suction member of the mixing tube is not effected satisfactorily due to a small flow rate of the mixed gas. In consequence, air cannot be secured in an amount sufficient for the fuel combustion, causing incomplete combustion.

In view of the above, the space interval is preferably from 6 to 15 mm., most preferably 10 mm. Consequently, the most preferable size of the glass (heat-transmitting element) will be 92 mm. in inner diameter and 125 mm. in height (so as to meet the effective length of combustion element). In determining the diameter and height of the glass, consideration should also be given to the workability and mechanical strengths of the product because a short, thick glass cylinder is difficult to fabricate and has reduced mechanical strengths.

*Space interval between inner and outer metal net cylinders*

The space between the inner and outer metal net cylinders forming a combustion chamber is of importance. As the space increases, the inner metal net cylinder will have a smaller diameter and accordingly a smaller heat capacity. Therefore, while the temperature of the cylinder is elevated high, there will be less thermal effect on the outer metal net cylinder because of the great space interval, with the consequence that a temperature difference is produced between the inner and outer metal net cylinders, which is objectionable from the standpoint of appearance.

On the contrary, when the space interval is too small, the short flame of the burning fuel on the surface of the outer metal net cylinder is cooled upon contact with the outer surface of the inner metal net cylinder, with the consequence of incomplete combustion. In view of the foregoing, the space distance is preferably from 6 to 15 mm., most preferably of the order of 10 mm.

The radiating burner apparatus of the construction and function described has the advantages set out below:

(1) It is possible to obtain infrared rays of useful wavelengths from the radiating element.

As described previously, the infrared rays which are effectively absorbed by the human body and clothes are those having a wavelength from 3 to $4\mu$ and from 6 to $11\mu$. The radiating burner apparatus of the invention is capable of radiating these infrared rays from the metal net radiating element without being absorbed by the ceramic glass, for heating of the human body or drying or other applications. The wavelengths of the infrared rays radiated by the burner apparatus are concentrated in the vicinity of $3\mu$, so that the infrared rays are not particularly harmful to the human body and produce other effects in addition to heating. There are no infrared rays emitted whose wavelengths are shorter than those mentioned.

(2) The temperature of the burner is high.

In conventional radiating burner apparatus, a ceramic or metal net radiating element is heated by the combustion heat of a Bunsen burner and the combustion flame is formed on the outer peripheral surface of the radiating element, such as metal net cylinder, by ejecting a fuel gas from the interior. Thus, the high temperature combustion gas is directly exposed to the atmosphere and therefore is not used for elevating the temperature of the burner body proper. In the radiating burner apparatus according to the invention, in contrast thereto, the combustion flame is formed from the interior to the exterior of the metal net cylinder so that the high temperature combustion gas is concentrated at the center of the apparatus, producing a high temperature atmosphere interior of the metal net cylinder. As a result, the temperature of the metal net or the radiating element can be elevated to about 850° C. with no generation of carbon monoxide or flash back. This is due to the fact that the combustion of the mixed gas consisting of a fuel gas and air is not interrupted owing to the heat of the high temperature atmosphere at the center of burner apparatus even when the mixed gas is fed in an amount larger or smaller than that required for the gas to be burnt at a point adjacent the meshes of the metal net, or the fact that the temperature of the atmosphere is not lowered excessively. Moreover, the metal net, which has relatively large meshes (the air space ratio being from 30 to 50%) and a small resistance to a gas passing therethrough, provides for flow of the mixed gas at a high rate, so that even when the metal net is heated to high temperatures, there is no danger of flash back. None of the conventional radiating burner apparatus had such effect.

(3) Radiant intensity is high.

The intensity of a radiation from a radiating element becomes high and its wavelength becomes short with the temperature of the heat generating element being elevated. On the contrary, the intensity of a radiation becomes weak and its wavelength becomes long as the temperature of the heat generating element lowers. An excessively high intensity of a radiation results in an increase of visible ray and therefore degradation of thermal characteristics. The optimum wavelength of the radiation from a radiating burner apparatus as used for heating or drying, as mentioned previously, is on the order of $3\mu$ and accordingly the temperature of the burner is required to be about 850° C. According to the present invention, this temperature can be achieved by the formation of a high temperature combustion gas atmosphere interior of the metal net cylinder which is surrounded by the glass (heat-transmitting element). It is thus possible to obtain a powerful radiating element which is capable of emitting a radiation whose intensity per unit of gas consumption is 2.6 times that of the radiation from a radiating burner apparatus of the type in which a radiating refractory material is heated by Bunsen burner. Still further, with the radiating burner apparatus of the invention in which a part of the heat generated is absorbed by the glass, it is possible to obtain a radiant intensity higher than that with the similar type of burner apparatus using a metal net.

(4) Combustion is stable against exterior air flow or cold substances such as water.

In the radiating burner apparatus of the invention, since the periphery of the radiating element is protected by a crystallized glass, the combustion of the gas is carried out under stabilized conditions without being subjected to any influence of a strong exterior air flow when, for example, the burner apparatus is used in the presence of a fan or is used outdoors on a windy day. With conventional burner apparatus, however, the gas combustion is interfered with by a wind of a velocity as low as 1 m./s., with the consequence that an abnormal sound is generated and the burner temperature is lowered and a large amount of carbon monoxide is generated due to incomplete combustion at the low temperature portion of the combustion element. Similarly, the combustion in the burner apparatus of the invention is not affected by water or other heat-absorbing substances which may inadvertently be ejected towards the burner apparatus since the burner is protected by a crystallized glass. It was usual with conventional burner apparatus that the combustion was stopped immediately or the fuel was burnt incompletely, under such a condition. The crystallized glass used in the radiating burner apparatus of the invention for the protection of the combustion element is resistive against an abrupt cooling or heating as well as conventional ones.

(5) Combustion adjustment range is large.

In conventional radiating burner apparatus, the radiation temperature of the burner emitting a radiation is adjustable in the range of about 50° C. between 800° and 750° C. Such a narrow range of temperature adjustment is attributed to the type of the burner apparatus in which a metal net or ceramic is heated red-hot by a burner of the Bunsen burner type. A reduction of gas consumption in the burner apparatus of the type described has resulted in an immediate reduction of the quantity of heat generated by the flame, thereby subjecting the heated refractory material to the influence of the atmosphere, and consequently the ability of burning a fuel gas satisfactorily and thereby heating the refractory material is reduced drastically. This is because the temperature of the radiating element is elevated by the combustion of the fuel gas by means of a part of the heat in said radiating element. Therefore, any change in the condition of the mixture consisting of a fuel gas and air causes the temperature of radiating element to be lowered sharply. In the radiating burner apparatus of the invention in which the combustion element has interior thereof a combustion gas atmosphere of high temperature and is also protected by the crystallized glass against the exterior air, however, temperature lowering due to change in the flow rate of gas is well compensated by the heat of the combusting element proper, thus enabling the high temperature combustion to be continued. For this reason, the temperature for a stable combustion can be adjusted in a range as wide as 150° C. between 850° to 700° C. within the radiation temperature range. As far as stable combustion is concerned, it can be continued at temperature below the lower limit of 700° C., though radiant intensity is lowered.

(6) All of the air required for satisfactory combustion can be supplied at one stage, no secondary air being needed.

The radiating burner apparatus of the present invention employs, as the critical component parts, plain weave metal nets of a simple construction which are readily obtainable. The combustion area is composed of a sheet of the metal net formed into a cylindrical shape, in which another cylinder similarly formed is disposed. The meshes of the metal nets are so large as to cause flash back if it is used in a radiating burner apparatus of the conventional type in which a fuel gas is ejected from the interior to the exterior of the net. As such, the metal nets used in the present invention provide little resistance to a gas and air passing therethrough. Furthermore, the metal nets used in the present invention do not form a multiplicity of layers of more than two, as in conventional types. Due to the foregoing, in the present invention, air in an amount more than that required for the fuel combustion can be sucked in by the ejection of gas, so that the gas is burnt completely only with the primary air and there is no need for providing a secondary air at all. According to the present invention, therefore, no consideration is required in designing for the contact of a fuel gas with a secondary air at the radiating element and for the provision of a passage through which the secondary air is to be introduced, as is required heretofore. In an extreme case, the radiating element portion may be placed in water or in an atmosphere in which no oxygen is present, whereby the stable combustion of the fuel gas is not affected as in the atmosphere.

For further simplification of the construction, the inner metal cylinder may be omitted without substantial adverse effect on the object to be achieved. Even in this case, it is possible to obtain a satisfactory combustion, though the radiant intensity is lowered somewhat due to temperature lowering of the burner.

(7) Stable combustion is not adversely affected by a change in property of fuel gas.

Since the combustion element in the radiating burner apparatus of the present invention has a high temperature atmosphere generated in the interior thereof and is protected against the exterior substances by the crystallized glass, as described previously, the specification of the radiating burner apparatus according to the invention will not be subjected to appreciable changes for use with gases, e.g. coal gas, such as city gas, and L.P.G., such as propane gas, which have different quantities of heat characteristics. All that is required to obtain a desired radiating combustion is to select a nozzle which is suitable for the pressure and quantity of heat of the fuel used.

(8) Ignition is easy.

Although means for ignition is not specifically described herein either structurally or functionally, the ignition can be readily effected by lighting a match or a lighter at a point in the proximity of the center above the inner metal cylinder, whereby the combustion of gas is propagated over the entire surfaces of the metal nets instantaneously, because in the radiating burner apparatus of the invention the combustion gas flows from the outer metal net cylinder towards the center of the inner metal net cylinder with a sufficient amount of air mixed therein and is discharged from the top of the inner cylinder and during this period the mixed gas is subjected to no influence of the exterior air flow. Therefore, upon ignition, the mixed gas is burnt all over the surfaces of the metal nets all at once and in no cases the gas is burnt only at a portion on the surface or the combustion expands from one point to the entire surface gradually.

In conventional burner apparatus, ignition is not effected positively by being subjected to the influence of exterior air, or means must be provided to render the ignition flame long for quick propagation of the flame or to scan the flame over the entire surface.

(9) Combustion may be carried out with no sound.

The mixed gas consisting of a fuel gas and air is delivered to the metal nets of the radiating element at a relatively high rate and, since the metal nets are not provided in a multiplicity of layers, and, further, since the flame nozzles formed in the metal nets are relatively large, the combustion of the gas at the flame nozzles is carried out smoothly with no sound. The radiating burner apparatus of the invention, therefore, is suitable for use at a place where generation of sound is inhibited. In addition, while the radiating burner apparatus of conventional types had the tendency of producing a sound when used in a wind, the radiating burner apparatus of the invention may be used under a strong wind without causing any sound.

(10) Radiation can be concentrated in one direction.

Under normal condition, the radiating burner apparatus of the invention radiates infrared rays peripherally in all directions. However, when the infrared rays are desired to be concentrated in one direction, this can be achieved easily by providing a reflecting plate at a portion on the periphery thereof.

(11) Stable combustion can be obtained even after repeated heating and cooling.

According to the present invention, as described previously, the inner and outer metal net cylinders, which serve as radiating elements, are suspended interior of the heat-resistant and transmitting element with the top ends engaging with the upper end of said heat-transmitting element. Therefore, the metal nets are permitted to expand downwardly freely due to thermal expansion as the temperature elevates with no interference, and to contract to the original dimensions upon cooling.

*Applications of the radiating burner apparatus of the invention*

Although the radiating burner apparatus of the invention has been described herein specifically with reference to one of circular cross-section, the burner apparatus may be of an elliptical cross-section or a polygonal cross-section having more than three corners, with no change in the effect obtained. This is true in the extreme case wherein the cylindrical shape is deformed into an ellipsoidal shape to the extreme degree to form substantially a planary shape. Moreover, even when the cylindrical shape is developed into a planary shape, the same effects of radiation can be obtained providing that some means is provided for the maintenance of high temperature at the high temperature combustion gas portion in the center thereof. Although the radiating burner apparatus of the invention is most suitably used for heating of the human body and drying in view of the wavelength characteristics of the radiation to be emitted, it may also be used for heating water, for heating and drying for the industrial purposes or for heating and drying in a toxic atmosphere, by the radiation emitted either circumferentially or in one direction as desired, inside or outside of the house without being subjected to the atmospheric conditions.

What is claimed is:

1. A radiating burner apparatus comprising a fuel ejecting nozzle, a mixing tube for mixing therein a fuel ejected through said fuel ejecting nozzle with a primary air sucked in by the fuel being ejected by means of the jetting force of the fuel and a mixing chamber connected to said mixing tube and having one side open, said radiating burner apparatus being characterized by a cylinder made of a heat-resistant, heat-transmitting material disposed in said mixing chamber, an annular cap having a gas exhausting opening formed therein and adapted to close the top end of said cylinder, an outer metal net cylinder formed of a metal net which is woven with a heat-resistant wire and secured to the inside of said annular cap in spaced relation to said heat-resistant, heat-transmitting element, a bottom plate to cover the bottom opening of said outer metal net cylinder, said cylindrical heat-resistant, heat-transmitting element and said outer metal net cylinder defining a mixed gas passage therebetween, and an inner metal net cylinder disposed interior of said outer metal net cylinder in a spaced relation and formed of a metal net which is woven with a heat-resistant wire in the similar manner as said outer metal net cylinder, the top end of said inner metal net cylinder being secured to said annular cap and a flange supporting the bottom end of the inner metal cylinder to space it from the outer metal net cylinder, and said mixed gas being burnt on the interior surface of said outer metal net cylinder.

2. A radiating burner apparatus comprising a housing made of a heat-resistant, heat-transmitting material, a cap having a gas exhaust opening adapted to close the top end of said housing, an outer screen member formed of a metal net which is woven with a heat-resistant wire and secured to said cap in spaced relation to, and inside, said housing, a bottom plate covering the bottom opening of said outer screen member, said housing and said outer screen member defining a passage therebetween, means to supply an air/fuel mixture into said passage, and an inner screen member disposed inside said outer screen member in a spaced relation thereto and being formed of a metal net which is woven with a heat-resistant wire, means to space said inner screen member from said outer screen member, said air/fuel mixture being burned on the interior surface of said outer screen member.

3. A radiating burner apparatus according to claim 2, wherein said means to supply the air/fuel mixture comprises a fuel ejecting nozzle, a mixing tube for mixing therein a fuel ejected through said fuel ejecting nozzle with primary air sucked into said mixing tube by means of the jetting force of the fuel, and a mixing chamber connected to said mixing tube and having one side open, said housing being disposed in said mixing chamber.

4. A radiating burner apparatus according to claim 2, wherein said means to space said inner screen member from said outer screen member comprises a flange supporting the bottom end of said inner screen member.

5. A radiating burner apparatus according to claim 2, wherein said outer screen member is of a cylindrical shape, its metal net being woven with a heat-resistant wire having a diameter of from 0.15 to 0.55 mm. with the weft wires arranged perpendicularly of the warp wires so that the number of meshes formed on the weft wire per a length of 25.4 mm. is equal to the number of meshes formed on the warp wire and is from 20 to 50, and the total area of the air spaces in the meshes is substantially from 30 to 50 percent of the total surface area of the metal net.

6. A radiating burner apparatus according to claim 2, wherein said inner screen member is of a cylindrical shape, its metal net being woven with a heat-resistant wire having a diameter of from 0.15 to 0.7 mm. with the weft wires arranged perpendicularly of the warp wires so that the number of meshes formed on the weft wire per a length of 25.4 mm. is equal to the number of meshes formed on the warp wire and is from 10 to 50, and the total area of the air spaces in the meshes is substantially from 30 to 50 percent of the total surface area of the metal net.

7. A radiating burner apparatus according to claim 2, wherein said outer screen member is of a cylindrical shape, its metal net being woven with a heat-resistant wire having a diameter of from 0.15 to 0.55 mm. with the weft wires arranged perpendicularly of the warp wires so that the number of meshes formed on the weft wire per a length of 25.4 mm. is equal to the number of meshes formed on the warp wire, normally being plain weave, and is from 20 to 50; wherein said inner screen member is of a cylindrical shape which is smaller in diameter than said outer screen member, its metal net being woven with a heat-resistant wire having a diameter of from 0.15 to 0.7 mm. with the weft wires arranged perpendicularly of the warp wires so that the number of meshes formed on the weft wire per a length of 25.4 mm. is equal to the number of meshes formed on the warp wire, normally being plain weave, and is from 10 to 50, the total areas of the air spaces in the meshes of said screen member being substantially from 30 to 50 percent of the respective total surface areas thereof; and wherein said passage and the space interval between said outer screen member and said inner screen member is from 6 to 15 mm.

8. A radiating burner apparatus according to claim 2, wherein said housing is adapted to transmit a large proportion of the total rays radiated by said inner and outer screen members, said transmitted rays having wave lengths which promote absorption by a substance to be heated, said housing absorbing a part of the infra-red rays of the wavelengths which are not valuable to thereby promote heating of said inner and outer screen members.

9. A radiating burner apparatus according to claim 8, wherein said inner and outer screen members form a combustion chamber therebetween, said housing completely enclosing said screen members and said gas exhaust opening extending over said combustion chamber, so that said combustion chamber is not subjected to any external influence.

10. A radiating burner apparatus according to claim 7, wherein said housing and said screen members are all of a cylindrical form.

11. A radiating burner apparatus according to claim 2, wherein said housing is made of crystallized glass.

References Cited

UNITED STATES PATENTS

| | | | |
|---|---|---|---|
| 377,502 | 2/1888 | Sellon | 67—88 |
| 2,936,751 | 5/1960 | Forniti | 158—99 X |
| 3,114,411 | 12/1963 | Dada | 158—116 |
| 3,147,960 | 9/1964 | Ruff | 158—99 X |
| 3,191,659 | 6/1965 | Weiss | 158—116 |
| 3,233,653 | 2/1966 | Nakamura | 158—99 |

FOREIGN PATENTS 494,087   10/1938   Great Britain.

FREDERICK L. MATTESON, JR., *Primary Examiner.*

H. B. RAMEY, *Assistant Examiner.*